(12) United States Patent
Koch

(10) Patent No.: US 10,376,041 B2
(45) Date of Patent: Aug. 13, 2019

(54) ELECTRICALLY ADJUSTABLE TABLE SYSTEM AND METHOD FOR PRODUCING AN ELECTRICALLY ADJUSTABLE TABLE SYSTEM

(71) Applicant: LOGICDATA Electronic & Software Entwicklungs GmbH, Deutschlandsberg (AT)

(72) Inventor: Walter Koch, Schwanberg (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 133 days.

(21) Appl. No.: 15/532,062

(22) PCT Filed: Nov. 10, 2015

(86) PCT No.: PCT/EP2015/076220
§ 371 (c)(1),
(2) Date: May 31, 2017

(87) PCT Pub. No.: WO2016/087170
PCT Pub. Date: Jun. 9, 2016

(65) Prior Publication Data
US 2017/0340101 A1  Nov. 30, 2017

(30) Foreign Application Priority Data
Dec. 1, 2014  (DE) .................. 10 2014 117 590

(51) Int. Cl.
*A47B 9/00*  (2006.01)
*H01R 12/61*  (2011.01)
(Continued)

(52) U.S. Cl.
CPC ............. *A47B 9/00* (2013.01); *H01R 12/616* (2013.01); *H01R 12/675* (2013.01); *H01R 43/01* (2013.01);
(Continued)

(58) Field of Classification Search
CPC ............. A47B 9/00; A47B 2200/0058; A47B 2200/0059; A47B 2200/0061;
(Continued)

(56) References Cited

U.S. PATENT DOCUMENTS

| 6,964,372 B1 | 11/2005 | Peterson |
| 2011/0215207 A1 | 9/2011 | Koder et al. |
| 2016/0051042 A1 | 2/2016 | Koch |

FOREIGN PATENT DOCUMENTS

| DE | 10253566 A1 | 5/2003 |
| DE | 102005048490 A1 | 11/2006 |

(Continued)

*Primary Examiner* — Hal Kaplan
(74) *Attorney, Agent, or Firm* — Morgan, Lewis & Bockius LLP

(57) ABSTRACT

An electrically adjustable table system includes a table, at least one electric drive for adjusting the table, a voltage supply, a control and a bus system. The at least one drive, the voltage supply and the control are connected to the bus system. The bus system comprises multiple multiwire cable sections, which are electrically connected to one another via insulation displacement connectors.

15 Claims, 2 Drawing Sheets

(51) Int. Cl.
*H01R 12/67* (2011.01)
*H02K 11/00* (2016.01)
*H01R 43/01* (2006.01)

(52) U.S. Cl.
CPC .. *H02K 11/0094* (2013.01); *A47B 2200/0058* (2013.01); *A47B 2200/0059* (2013.01); *A47B 2200/0061* (2013.01)

(58) Field of Classification Search
CPC .... H01R 12/616; H01R 12/675; H01R 43/01; H02K 11/0094
USPC ......................................................... 307/147
See application file for complete search history.

(56) References Cited

FOREIGN PATENT DOCUMENTS

| | | | | |
|---|---|---|---|---|
| DE | 102010046769 A1 | 3/2012 | | |
| EP | 1837723 A2 | 9/2007 | | |
| WO | WO-2009003918 A1 | * 1/2009 | ............... | A47B 9/00 |
| WO | 2014/146963 A1 | 9/2014 | | |

* cited by examiner

ELECTRICALLY ADJUSTABLE TABLE SYSTEM AND METHOD FOR PRODUCING AN ELECTRICALLY ADJUSTABLE TABLE SYSTEM

BACKGROUND OF THE INVENTION

The present disclosure relates to an electrically adjustable table system as well as to a method for producing such a table system.

Electrically adjustable table systems usually include a table, one or multiple electric drives and corresponding control electronics for controlling the drives. The individual components of the table system can be connected to one another via an electric bus system in order to transmit supply voltages and control signals. Usually, for cabling of the components, cables which are fixedly connected to the components are provided, the cables interconnected via plug connectors. As an alternative, preassembled cables of fixed length are used. These cables are adapted to the largest possible dimension of the table. Thus, in smaller tables, parts of the cable must be stored in or under the table, e.g. by rolling or winding. Besides an increased mounting effort, unnecessary cables and thus resources are used in conventional cabling.

SUMMARY OF THE INVENTION

The present disclosure provides an improved cabling concept for electrically adjustable table systems, which can be implemented in a more efficient manner.

The idea underlying the improved cabling concept is the use of individual, preferably multiwire (German "mehradrig", English also "multicore") cable sections for components in a table systems instead of preassembled cables, these cable sections connected to one another via insulation displacement technology, in particular insulation displacement connectors, in particular in a bus system. As a result, the cable amounts required for the table system can be optimized. On the one hand, this results in less cables being used for the cabling. Furthermore, excessive cable amounts need no longer be stored or wound-up or rolled under the table, since the cable length can be adapted to the table dimensions in an optimum manner.

One possible embodiment of an electrically adjustable table system according to the improved cabling concept includes a table, at least one electric drive for adjusting the table, a voltage supply, a control and a bus system. The at least one drive, the voltage supply and the control are connected to the bus system. The bus system comprises multiple multiwire cable sections, which are electrically connected to one another via insulation displacement connectors. For example, these cables are configured as ribbon cables. The cable sections can be produced from a multiwire cable available by the meter, for example. The term ribbon cable includes all multiwire cables, in which the strands are guided in parallel to one another. Such ribbon cables have a rectangular or substantially rectangular cross-section. Here, a surface along the parallel strands is smooth or substantially smooth, or, as an alternative, allows differentiating the individual strands so that a waved surface is produced.

The ribbon cables can also be formed with an asymmetric profile cross-section, which is adapted to a shape of the insulation displacement connectors. An unambiguous connection or circuiting can be ensured thereby, so that undesired electrical connections can be prevented. For example, this takes effect as a protection against pole reversal.

In some electrically adjustable table systems, e.g. intelligent motors can be used, which have a control electronics integrated directly on the drive besides the actual electric drive. Such intelligent drives usually use the supply voltage provided for operating the respective electric motor, with control being effected via separate control signals. The electric motors are formed as brushless DC (BLDC) motors.

Such motors are connected to the bus systems, with both the required supply voltage and the control signals for the individual drives being transmitted via the bus system. The control signals are available to all participants connected to the bus system, but will be evaluated or implemented only by those participants addressed via the control signals.

The at least one electrical drive serves for height adjustment of the table, for example, which is why a second electric drive may be provided as well, so that a distinct drive is provided on each table foot or table leg. Instead of using the electric drive for height adjustment, it can also be used for adjusting an inclination angle of a table top of the table. Other adjustment options are not excluded of course.

For example, the at least one electric drive is fixedly connected to a first end of one of the cable sections, while the associated second end of this cable section is connected to the bus system via one of the insulation displacement connectors. Thus, when mounting the table system, the at least one electric drive can be mounted in a table leg of the table, for example, so that the fixedly connected cable section projects from the table leg or a corresponding opening provided to that end. Preferably, this is also true for table systems having multiple such drives, e.g. in a table frame having two adjustable table columns. The cable section(s) of the drives can be electrically connected via a preassembled cable in the mounting process by employing the insulation displacement connectors.

Just as well, the control and/or the voltage supply can be connected to the bus system, in particular to the specifically assembled, i.e. length-adjusted, cable section.

For example, one or multiple of the insulation displacement connectors are fixed to the table. Thus, the cable sections are fixed to the table simultaneously.

In various embodiments, at least some of the cable sections are formed as ribbon cables. At least one of the cable sections formed as a ribbon cable is fixed to the table, e.g. the table frame or the table top, using an adhesive material. The rectangular or substantially rectangular structure of the ribbon cables allows for a stable fixation to be achieved in a simple and reliable manner. This is particularly true when a surface of the ribbon cable along the parallel wires has a smooth or substantially smooth design.

Double-sided adhesive tape or double-sided adhesive strips can be used as adhesive material, for example. These can be formed with or without a carrier, e.g. as double-sided adhesive tapes having a non-adhesive carrier material in the core or as acrylate foam adhesive tapes without non-adhesive carrier material.

In some embodiments, the bus system comprises two signal lines, which are provided for the transmission of supply voltage provided by the voltage supply and for the transmission of control signals modulated in the supply voltage. In such a configuration, in particular only these two control lines are needed to distribute energy and control signals via the bus system at the same time. In these configurations, it is possible for the bus system to comprise either exactly these two signal lines or additional lines serving for the transmission of other signals.

In an alternative embodiment, the bus system comprises two signal lines and at least two communications lines. The two signals lines are provided for the transmission of a supply voltage provided by the voltage supply. The at least two communication lines are provided for the transmission of control signals. For example, the control signals are transmitted according to the known CAN bus standard requiring a pair of CAN bus lines. The remaining communication lines, if present, can be used for the transmission of other signals.

In both afore-mentioned alternatives, the control signals to be transmitted can be generated by the control. Thus, the control is capable of modulating control signals for the at least one electric drive onto the supply voltage or of transmitting them via the at least two communication lines according to the corresponding transmission standard, for example. The voltage supply comprises a power supply unit, for example, which is configured to generate the supply voltage from an AC line voltage. The supply voltage is generated as a DC supply voltage, for example.

Preferably, such a supply voltage is a small voltage in the range of about 20 V to 40 V, which can be used directly for the supply of DC drives. However, besides this DC supply voltage, the voltage supply or power supply unit can also output further voltages, e.g. a lower voltage in the range of approximately 5 V, which can be used for the supply of a control electronics or the like. For example, this lower voltage can be generated with lower power, in particular when compared to a motor power needed.

Of course, also further elements can be connected to the bus system, such as sensors of various types, which are connected to the bus systems via a respective one of the cable sections. For example, pressure or force sensors can be connected, these sensors measuring a load of the table. This can be used for known anti-trap protection measures or the like, inter alia.

In a further developed embodiment, the table system further comprises at least one further table having at least one further electric drive for adjusting the at least one further table. Incidentally, the at least one further electric drive is also connected to the bus system. It goes without saying that the further table can also comprise more than one electric drive. As a result, one or multiple independent electric drives are provided for each table of the table system, these drives being capable of taking the respective power required for an adjustment process from the bus system. This power is provided by the voltage supply.

The two tables, or in the case that more tables are included by the table system, the respective tables can be controlled individually by a common control. However, it is also possible for multiple controls to be connected to the bus system in order to provide each or almost each table with a distinct control.

In various embodiments, at least one of the insulation displacement connectors comprises a first base part for the reception of a first and a second of the cable sections and a second base part having a first and a second set of displacement connectors. The displacement connectors are electrically connected to one another in such a way that an electric contact between corresponding wires of the cable sections can be produced. Thus, the two cable sections received in the first base part can be electrically connected to one another with little effort via the insulation displacement connector. Preferably, this is effected without solder connections, screw connections or insulations.

For example, the first base part comprises a first and a second cable reception, in which the cable sections to be connected can be placed. In a closed state of the insulation displacement connector, the second base part is applied onto the first base part in such a way that the displacement connectors engage in the first and second cable receptions in order to penetrate the placed cable sections. An electric contact between corresponding wires of the cable sections can be produced thereby.

For example, the second base part is mechanically fixable on the first base part so that the electric connection is reliably maintained. For example, the mechanical connection can be realized via a snap-fit connection or the like. In order to be able to provide the force required for the displacement connectors to penetrate the wires of the cable sections, in some embodiments of the insulation displacement connector, a corresponding lever arrangement is provided, which allows a manual closing of the insulation displacement connector with little effort by lever transmission. Thus, the use of tools such as tongs can be dispensed with.

In some embodiments, at least one of the insulation displacement connectors is free from an end stop for cable sections to be connected. Accordingly, at least one of the cable sections may run through the insulation displacement connector. This allows for a variable positioning of the insulation displacement connector on the cable section, which is particularly advantageous in longer cable sections. For example, one of the components to be connected can be connected with its respective cable section to the remaining bus system in a flexible manner.

According to one embodiment of a method for producing an electrically adjustable table system according to the improved cabling concept, at least one electric drive is mounted on a displaceable part of a table. Furthermore, a voltage supply and a control are being mounted. A multiwire cable available by the meter is cut for producing at least one cable section of suitable length. A bus system, to which the at least one drive, the voltage supply and the control are connected, is produced in such a way that the bus system comprises the at least one cable section of suitable length as well as further multiwire cable sections, which are electrically connected to one another via insulation displacement connectors.

Thus, a cabling of such a table system according to the improved cabling concept can be produced with little effort regarding material and time.

Further embodiments for the method result directly from the various embodiments of the table system corresponding to the above description.

BRIEF DESCRIPTION OF THE DRAWINGS

Hereinafter, the cabling concept will be described by means of the multiple drawings and using exemplary embodiments. Like reference numerals indicate elements or components having the same function. As far as elements or components correspond each other regarding their functions, a repeated description in each of the Figures will be omitted.

Shown are in.

DETAILED DESCRIPTION

Figure 1:
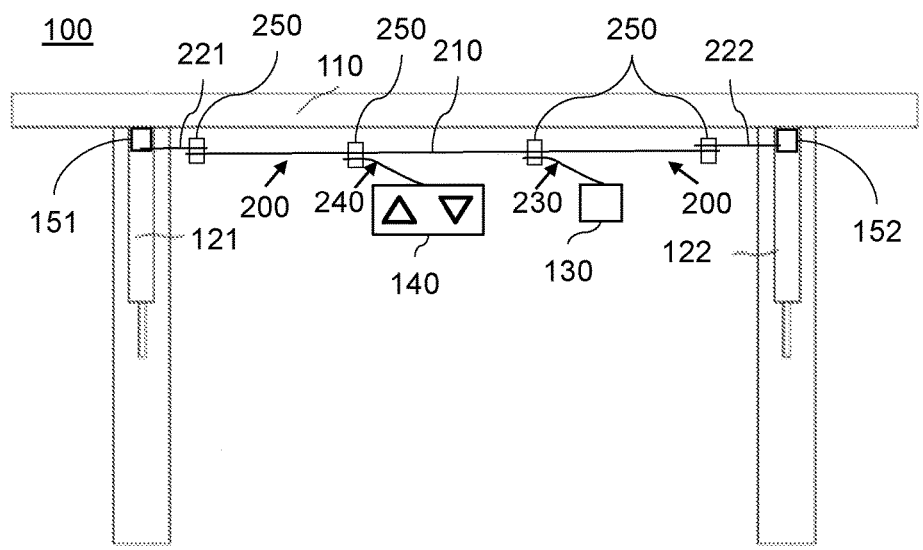
FIG. 1 an embodiment of an electrically adjustable table system.

FIG. 1 shows an embodiment of an electrically adjustable table system having a table 100, which comprises a height-adjustable table top 110, for example. An electric drive 121, 122 is provided in each of the, for example two, illustrated table legs. Furthermore, the table comprises a voltage supply 130 and a control 140. Furthermore, the electrically adjustable table system includes a bus system 200, to which the two drives 121, 122, the voltage supply 130 and the control 140 are connected.

The bus system 200 is formed of multiple cable sections 210, 221, 222, 230, 240 as well as corresponding bus connectors. These bus connectors are formed as insulation displacement connectors 250, which electrically connect the in each case multiwire cable sections with one another.

In various embodiments, at least some of the cable sections 210, 221, 222, 230, 240 are designed as ribbon cables. Incidentally, at least one of the cable sections formed as a ribbon cable is fixed to the table, e.g. the table frame or the table top, using an adhesive material. A double-sided adhesive tape or a double-sided adhesive strip can be used as the adhesive material, for example.

Alternatively or additionally, one or multiple of the insulation displacement connectors 250 can be fixed directly to the table 100, e.g. on the table top 110 or the table legs. This also allows fixing the bus system 200 to the table.

For example, the voltage supply 130 comprises a power supply unit, which generates a supply voltage, in particular a DC supply voltage, from an AC mains voltage.

In operation of the arrangement, the voltage supply 130 supplies the bus system 200 with such a DC supply voltage serving as a power supply for the drives 121, 122. The DC supply voltage ranges between approximately 20 V and 40 V, and is 30 V, for example. Besides the DC supply voltage, control commands or control signals, in particular bus control commands or bus control signals, can be transmitted via the bus system 200 as well, these signals or commands being output by the control 140 and received by the drives 121, 122, for example. However, it is also possible that the two drives 121, 122 provide status messages or measurement values on the bus system, which can be evaluated in the control 140, for example.

Of course, further elements can be connected to the bus system 200, e.g. sensors of various types. For example, pressure or force sensors 151, 152 can be connected, which measure a load of the table. This can be used, inter alia, for known anti-trap protection measures or the like. According to the improved cabling concept, the connection of such further elements is also effected via corresponding multiwire cable sections, which are connected to the bus system via insulation displacement connectors.

In various embodiments, the bus system 200 can be formed with one single conductor pair for the provision of the supply voltage. The different bus signals, in particular control signals, are modulated on the supply voltage, for example, or encoded otherwise. Accordingly, the bus system comprises merely two signal lines, for example, which are provided for the transmission of a supply voltage provided by the voltage supply and control signals modulated in the supply voltage. This will be explained in greater detail in conjunction with FIG. 2 and FIG. 3A.

Figure 2:
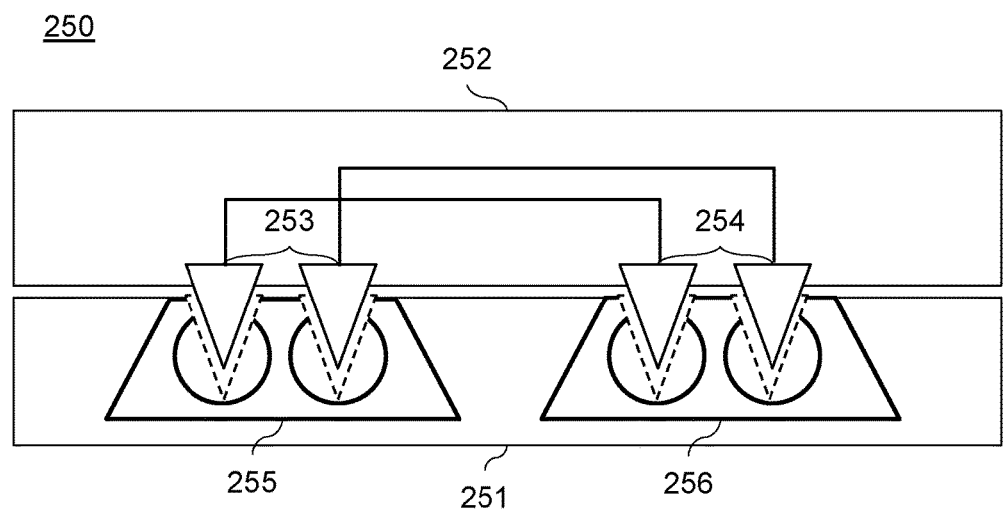
FIG. 2 an embodiment of an insulation displacement connector.

FIG. 2 shows a schematic cross-section through an insulation displacement connector 250, which comprises a first base part 251 and a second base part 252. In the upper, second base part 252, a first and a second set of displacement connectors 253, 254 are provided, which consist of a cutting, conductive material. The two sets 253, 254 are electrically connected to one another in such a way that corresponding wires of a multiwire cable section can be connected with one another.

In the lower, first base part 152, a first and a second cable reception 255, 256 are provided, each capable of receiving a two-wired cable, preferably a ribbon cable. In the illustrated closed state of the insulation displacement connectors 250, the displacement connectors 253, 254 engage in the placed cable sections by penetrating through an insulation and projecting into the conductor wire of the cables. Thus, a simple connection of the two cable sections can be effected. A mechanical fixation of the second base part 252 on the first base part 251 is not shown merely for reasons of clarity.

Figure 3A:
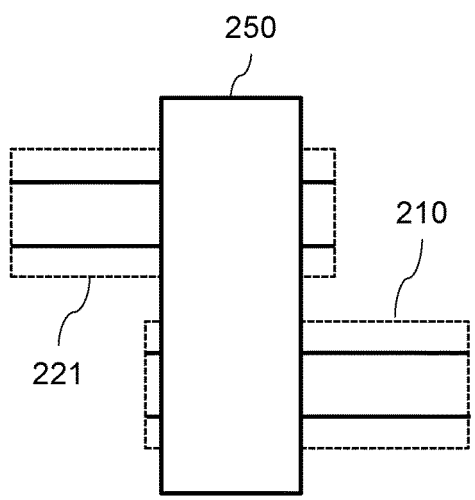
FIGS. 3A and 3B further embodiments of insulation displacement connectors having cable sections.

FIG. 3A schematically shows an example of a plan view of such an insulation displacement connector 250, which connects cable sections 210, 221 each having two wires. Incidentally, the cable section 210 is inserted in the insulation displacement connector 250 from the right, the cable section 221, being inserted from the left. It goes without saying that the two cable sections 210, 221 can also be inserted from the same side. In the illustrated examples, this is achieved in that the insulation displacement connector 250 is free from an end stop for cable sections to be connected. Nevertheless, it is possible to provide such an end stop in alternative embodiments.

Figure 3B:
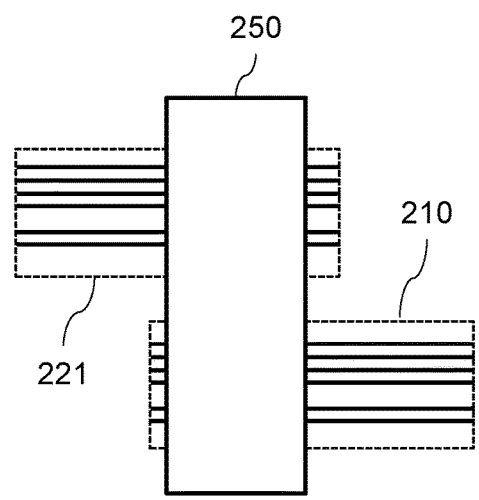

FIG. 3B shows an alternative embodiment, which is different from the embodiment of FIG. 3A merely by the number of the wires of the cable sections 210, 221 to be connected. In particular, the cable sections 210, 221 each have two signal lines for the transmission of the supply voltage and four further lines or wires, e.g. communication lines. However, the selection of four additional lines illustrated in FIG. 3B is of merely exemplary nature, so that a lower or higher number of additional lines can also be provided.

In addition to a conductor pair for the supply voltage and for a ground terminal, actually a line or a conductor pair for the transmission of control signals is also provided. For example, a transmission of these control signals is effected according to the known CAN bus standard, which allows the transmission of control signals between or to the electric drives. In addition, or as alternative, a different control line or a conductor pair can be provided, which are applied with a proprietary signal format or protocol, for example. In this way, participants that do not have a command of a general bus format such as a CAN bus formal can additionally or alternatively be connected to the bus system 200, for example.

A line for the transmission of an operating mode signal can be provided as another possible line in the bus system 200. One out of a plurality of operating modes or operating states can be selected by the selection of a certain voltage level, for example. In a normal operating state, the voltage supply 130 outputs full voltage or power, for example. Adjustment processes or other processes involving power demand are performed in this operating state, for example. The DC supply voltage has its highest value, e.g. approximately 30 V, in this operating state.

In a sleep mode, the table system is configured for example for lower power consumption, so that e.g. no adjustment processes are performed and possible displays of controls are turned-off. Nevertheless a basic voltage supply is maintained, which enables background activities of the connected participants, for example. For example, all participants connected to the bus system 200 are in an energy saving mode, in order to keep the power consumption of the overall system as low as possible. The DC supply voltage has a reduced value in this operating state, e.g. of approximately 10 V.

Besides the sleeping mode, even a third operating state, e.g. a hibernation mode, in which actually all components, which are connected to the bus system 200 and supplied with power, are turned-off. Merely an existing wake-up circuit of the voltage supply 130 is exempted, in which a corresponding signal via the operating mode signals causes that the desired power is again output to the bus system 200. Since such wake-up circuits are generally known, the specific configuration thereof will not be explained in greater detail. Thus, in this hibernation mode, no DC supply voltage is supplied to the bus system 200, or a DC supply voltage having a value of 0 V is output.

In the production of an electrically adjustable table system according to the improved cabling concept, as described in the above examples, a simplified connection can be achieved with less efforts in terms of time and material. For example, in the production of the corresponding bus system 200, a multiwire cable available by the meter is cut to the suitable length, in order to achieve the cable section 210 shown in FIG. 1. For example, the cable sections 221, 222 are fixedly connected to the corresponding electric drive with one end, and can thereby practically define the required length of the cable section 210. Also the cable sections 230, 240 on the voltage supply 130 and on the control 140 can be fixedly attached on one end, so that the other end can be fixed to the cable section 210 at any point via the insulation displacement connector 250. However, the cable sections 230, 240 may also individually be cut-to-size during the mounting process of the table system, when the corresponding components also comprise insulation displacement connectors provided by the devices, for example. The same is true for not-illustrated sensors, which can be connected to the bus system 200 via insulation displacement connectors 250 according to the same principle. In particular if the cable sections are configured as ribbon cables, these can be fixed to the table 100 in a simple manner via an adhesive material, in particular a double-sided adhesive tape or a double-sided adhesive strip.

The invention claimed is:

1. An electrically adjustable table system, comprising:
   a table;
   at least one electric drive for adjusting the table;
   a voltage supply;
   a control; and
   a bus system, to which the at least one drive, the voltage supply and the control are connected,
   wherein the bus system comprises multiple multiwire cable sections, which are electrically connected to one another via insulation displacement connectors.

2. The table system according to claim 1, in which the at least one electric drive is fixedly connected to a first end of one of the cable sections and an associated second end of these cable sections is connected to the bus system via one of the insulation displacement connectors.

3. The table system according to claim 1, in which at least one of the insulation displacement connectors is fixed to the table.

4. The table system according to claim 1, in which the bus system comprises two signal lines, which are provided for the transmission of a supply voltage provided by the voltage supply and control signals modulated onto the supply voltage.

5. The table system according to claim 1, in which the bus system comprises two signal lines, which are provided for the transmission of a supply voltage provided by the voltage supply, and at least two communication lines, which are provided for the transmission of control signals.

6. The table system according to claim 1, in which the control is configured to generate control signals to be transmitted via the bus system.

7. The table system according to claim 1, further including at least one sensor, which is connected to the bus system via one of the cable sections.

8. The table system according to claim 1, in which at least one of the insulation displacement connectors comprises a first base part for receiving a first and a second of the cable sections and a second base part having a first and a second set of displacement connectors, which are electrically connected to one another in such a way that an electric contact between corresponding wires of the cable sections can be produced.

9. The table system according to claim 8, in which the first base part comprises a first and a second cable reception, in which the cable sections to be connected can be placed, wherein in a closed state of the insulation displacement connector the second base part is applied to the first base part in such a way that the displacement connectors engage in the first and second cable reception in order to penetrate the placed cable sections.

10. The table system according to claim 1, in which at least one of the insulation displacement connectors is free from an end stop for cable sections to be connected.

11. The table system according to claim 1, in which at least one of the cable sections is configured as a ribbon cable and fixed to the table using an adhesive material.

12. The table system according to claim 11, wherein the adhesive material is a double-sided adhesive tape or a double-sided adhesive strip.

13. A method for producing an electrically adjustable table system, the method comprising:
   mounting at least one electric drive on an adjustable part of a table;
   mounting a voltage supply;
   mounting a control;
   cutting-to-size a multiwire cable available by the meter for producing at least one cable section of length adapted to the dimensions of the table; and
   producing a bus system, to which the at least one drive, the voltage supply and the control are connected, in such a way that the bus system comprises the at least one cable section as well as further multiwire cable sections, which are electrically connected to one another via insulation displacement connectors.

14. The method according to claim 13, wherein the at least one electric drive is fixedly connected to a first end of one of the cable sections and an associated second end of these cable sections is connected to the bus system via one of the insulation displacement connectors.

15. The method according to claim 13, wherein at least one of the insulation displacement connectors is fixed to the table.

* * * * *